Feb. 2, 1965   J. T. EVEREST ET AL   3,168,069
VEHICLES FOR TRAVELLING OVER A SURFACE
Filed March 8, 1963   4 Sheets-Sheet 3

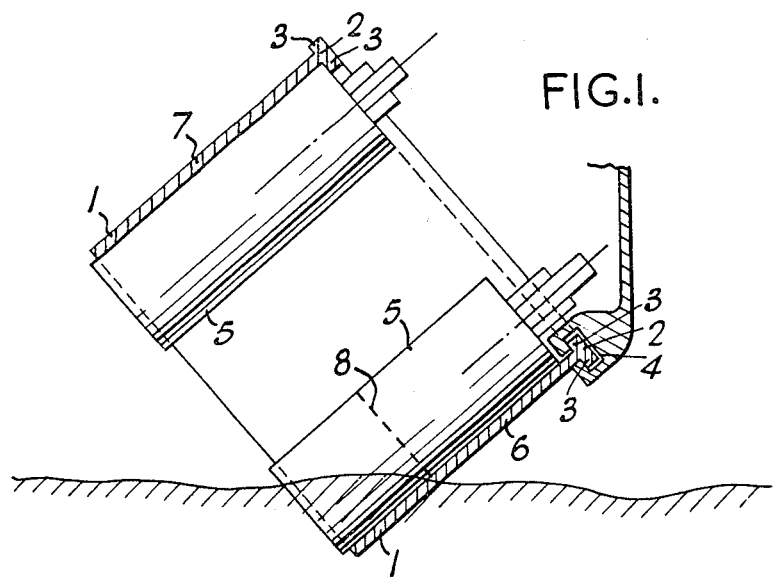
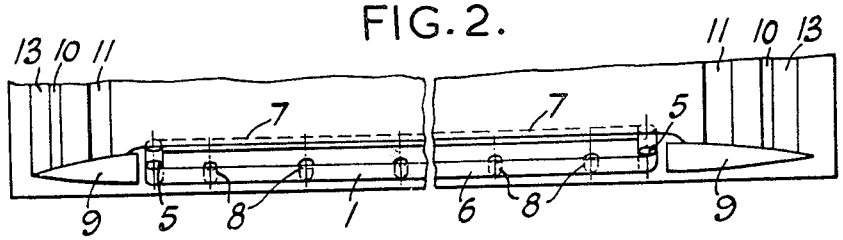
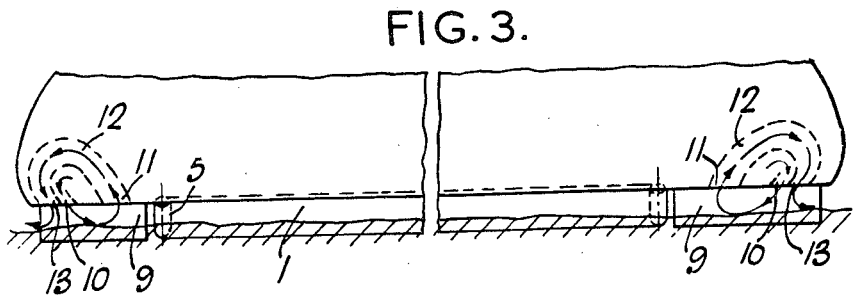

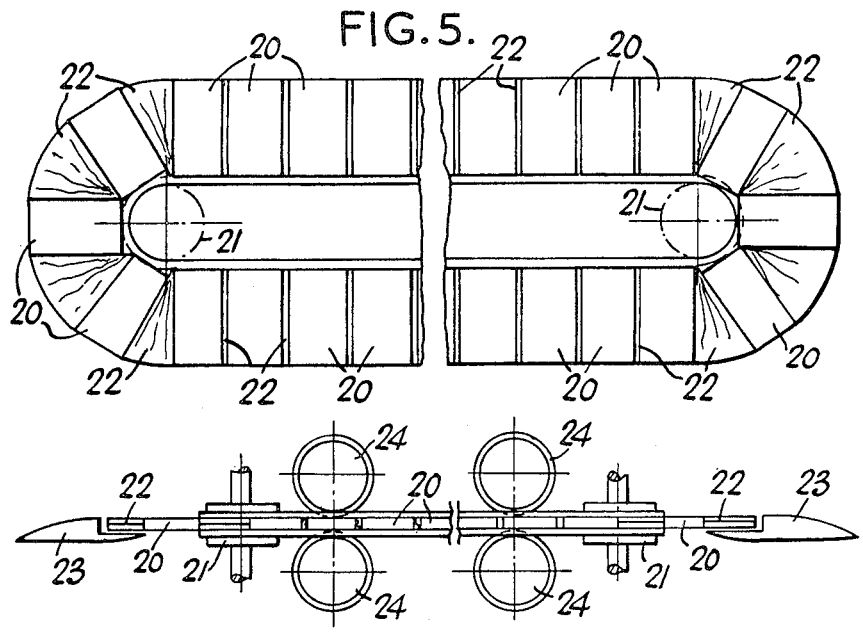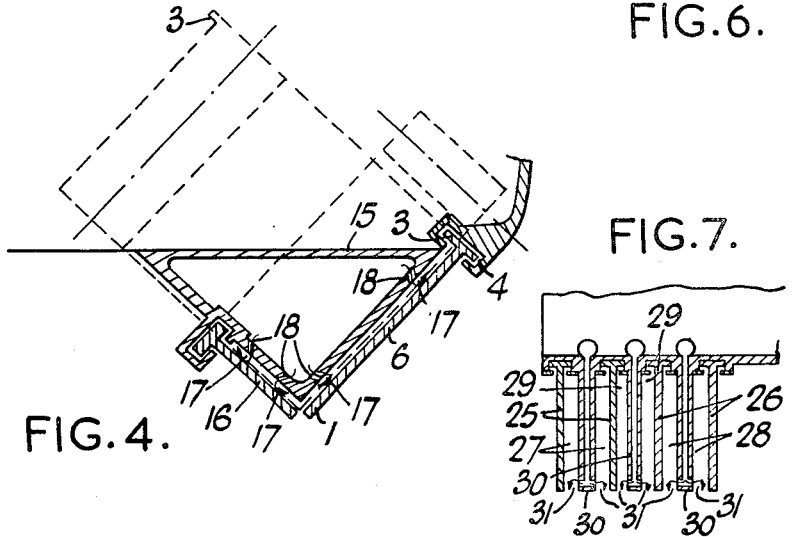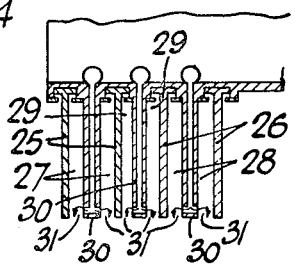

INVENTORS
J. T. EVEREST
R. B. PAGE

BY
Cameron, Kerkam & Sutton
ATTORNEYS

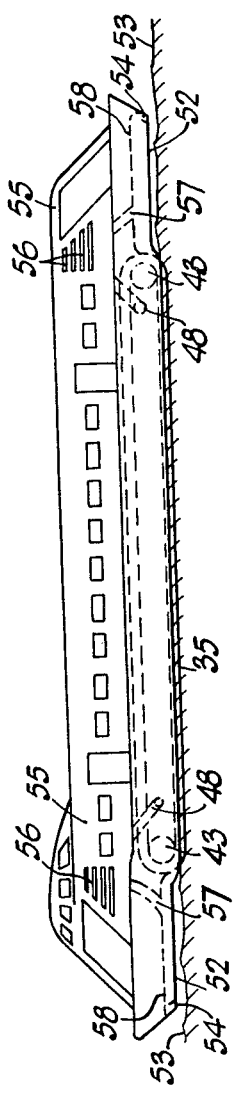
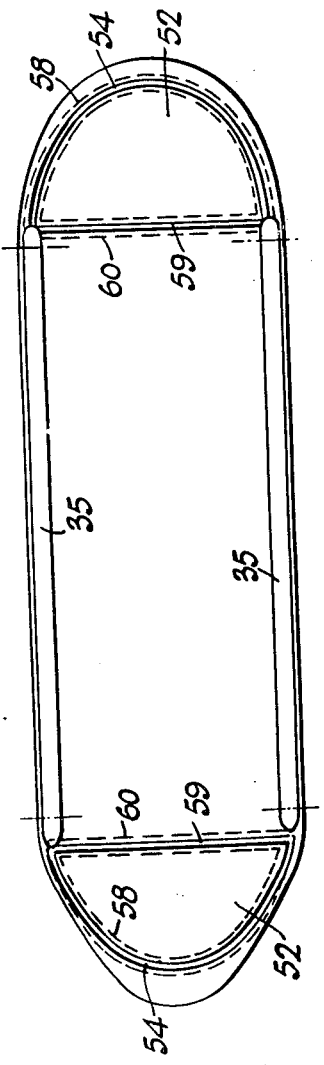
FIG.10.
FIG.11.

United States Patent Office 3,168,069
Patented Feb. 2, 1965

3,168,069
VEHICLES FOR TRAVELLING OVER A SURFACE
Julian Thomas Everest, South Darenth, near Dartford, Kent, and Reginald Bannerman Page, Hythe, England, assignors to Hovercraft Development Limited, London, England, a British company
Filed Mar. 8, 1963, Ser. No. 263,925
Claims priority, application Great Britain, Mar. 9, 1962, 9,148/62
21 Claims. (Cl. 115—1)

This invention relates to vehicles for traveling over a surface and which in operation are supported above the surface, at least in part, by a cushion of pressurised gas formed and contained beneath the vehicle.

It has been proposed, in a vehicle which it is intended to operate over water, to provide downwardly projecting walls for containing the cushion beneath the vehicle in the fore and aft direction, the gaps between the walls, for example at the front and rear of the vehicle, being closed by fluid curtains or flexible or flexibly attached doors and the like.

For high speed vehicles it is preferred to form fluid curtains from the bottoms of the walls, so that at high speeds the walls are always clear of the water or only just cut through the crests of waves. By this means, the drag can be reduced to an acceptable value. At lower speeds the vehicle can be operated so that the walls are always at least partly immersed over substantially their entire length. There is a saving in the power normally required to provide the fluid for forming the fluid curtains beneath the walls, and at lower speeds, the drag of the walls is usually sufficiently low to be acceptable.

Although the power requirements due to drag of the walls are considered as acceptable at lower speeds, this power still represents quite a large proportion of the total power requirements for the vehicle. If some means could be provided for reducing the drag substantial power savings could be made. The drag arises mainly due to the motion of the surface of the wall relative to that of the water, and of course, increases with speed.

In vehicles for travelling over surfaces such as mud, snow, sand and the like, it is possible to contain the cushion by one or more downwardly extending walls, which, for at least part of their height, are of flexible material. With such arrangements, particularly for that part of a wall extending along the side of the vehicle, any contact with the surface is liable to cause damage and there will also be power losses due to drag of friction, between the wall and the surface.

According to the invention there is provided a vehicle for travelling over a surface and which is supported above the surface, at least in part, by a cushion of pressurised gas formed and contained beneath the vehicle, the cushion being contained for at least a portion of that part of its periphery which extends in the fore and aft direction by a wall depending from the bottom of the vehicle, the wall comprising one or more movable members forming a belt-like construction, at least part of which comes into contact with the surface, and means for moving the member so that the part thereof which comes into contact with the surface travels along beneath the vehicle in a direction, relative to the vehicle, opposite to that in which the vehicle is moving.

In one example, the movable member is in the form of an endless belt, inclined at an angle to the vertical, which, whilst immersed and acting to contain the gaseous cushion, travels beneath the vehicle in a direction opposite to that in which the vehicle is moving, the belt then passing round pulleys and returning out of contact with the water.

The movable member can also be used to propel or assist in propelling the vehicle by causing it to travel faster than the relative speed of the vehicle and water.

The invention will be understood from the following description of certain embodiments, in conjunction with the accompanying drawings, in which:

FIGURE 1 is a vertical cross section, normal to the longitudinal axis, of one form of wall according to the invention, FIGURE 2 is an inverted plan view of one side of a vehicle embodying the wall illustrated in FIGURE 1 to a reduced scale, FIGURE 3 is a partial side view of the vehicle illustrated in FIGURE 2, FIGURE 4 is a cross section similar to FIGURE 1 illustrating a modification thereof, FIGURE 5 is a side view of an alternative form of wall according to the invention, FIGURE 6 is a plan view of the wall illustrated in FIGURE 5, FIGURE 7 is a vertical cross section, as in FIGURE 1, of a further alternative arrangement.

FIGURE 10 is a side view of a vehicle embodying the form of wall illustrated in FIGURES 9 and 10, and FIGURE 11 is an inverted plan view of the vehicle illustrated in FIGURE 10.

Figure 8:
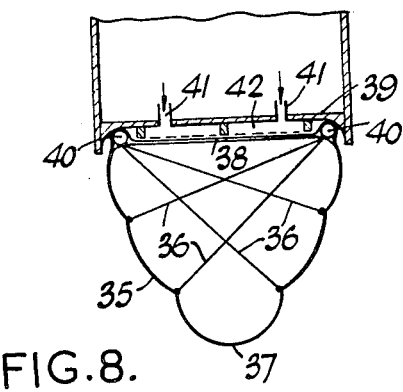
FIGURE 8 is a vertical cross section, as in FIGURE 1, of another form of wall according to the invention.

In the embodiment illustrated in FIGURES 1 and 2, the wall comprises an endless flexible belt 1 its top edge 2 having laterally extending flanges 3 which slide within a channel 4 formed in the bottom of the vehicle. The belt is inclined at an angle to the vertical and at each end of the wall the belt passes round inclined rollers 5. The belt is positioned so that one half, the forward run 6, of its length depends downwards below the bottom of the vehicle whilst the other half, the return run 7, is contained within the vehicle. The forward run 6 which depends below the bottom of the vehicle acts to assist in containing the cushion of pressurized gas beneath the vehicle. The belt is driven by the rollers 5 the direction of movement of the belt being such that the forward run 6 of the belt depending below the bottom surface of the vehicle is moving in a direction opposite to that of the vehicle. The rollers can be driven by any convenient means, not shown.

In order to prevent whipping of the belt and to provide means for controlling the tension, the return run of the belt, which is within the vehicle, may be caused to follow a sinuous path over a series of rollers.

The forward run 6 of belt 1 is, as indicated in FIGURE 1, partly immersed in the water and may also require supporting means additional to that provided by channel 4 at the top edge 2. Such support can be provided by additional rollers 8 extending downwards on an inclined axis similarly to the rollers 5 at each end of the belt. Depending upon the stiffness of the belt 6, the additional rollers need not extend for the full width of the belt. Thus the rollers may extend only so far as will avoid their bottom ends entering the water, thus avoiding drag losses, as indicated by the dotted line in FIGURE 1.

As will be seen from FIGURE 1, at the ends of the walls where the belt turns up into the vehicle at the front and comes down out of the vehicle at the rear the belt presents a shape to the water which will produce considerable disturbance of the water and a resulting increase in power requirements. This disturbance can be prevented by providing fairings 9 at each end. The fairings can be hollow and provide buoyancy to assist in stabilising the vehicle.

The gaps between the walls, at the front and rear, can be closed by air curtains issuing from the bottom surface of the main body of the vehicle. As seen in FIGURES 2 and 3 air issues from supply ports 10 flowing downwards and inwards and is then deflected upwards by the cushion pressure and flows into recovery ports 11. From the recovery ports 11 the air flows through ducts 12 to further supply ports 13, the air flowing downwards and inwards and then being deflected round and outwards, finally flowing out to the surrounding atmosphere. This formation of air curtains and others equally suitable are described and illustrated in the commonly owned, co-pending applications of Christopher Sydney Cockerell Serial No. 837,428, filed September 1, 1959, now abandoned, and Serial No. 6,999, filed February 5, 1960, now issued as Patent No. 3,117,643. The fairings 9 provide convenient members for sealing the ends of the air curtain systems.

FIGURE 4 illustrates a modification of the arrangement illustrated in FIGURE 1. The lower part or forward run 6 of the belt 1, which is partly immersed in the water, travels adjacent to a structural member 15 depending from the bottom of the vehicle. The structural member 15 is triangular in cross-section, the apex of the triangle being immersed in the water. A further belt 16 is provided, running at right angles to belt 1. The belts are supported on the structural member 15 by means of air cushions formed and contained between the belts and the structural member by air curtain 17 issuing from ports 18 formed in the structural member 15. The belts pass round rollers at each end of the structural member.

If only one belt was provided when a structural member was used then only half of the power loss due to drag can be avoided, as one surface of the structural member would be in contact with the water. By providing two belts, one on each surface of the structural member and extending at least for that part of each surface which is immersed, then substantially all of the power loss due to drag can be avoided. The actual cross-section of the structural member can vary with the belts operating at other than right angles to each other, but a cross-section of a right-angled triangle provides a convenient arrangement.

The arrangement illustrated in FIGURES 5 and 6 is one in which the belt-like construction forms a wall which can be positioned vertically beneath the vehicle, instead of inclined as the example illustrated in FIGURES 1 to 3. Such a construction is particularly convenient where it is desired to provide additional walls for dividing the cushion. The construction comprises a series of flat plate-like members 20 which in their operative position depend below the bottom surface of the vehicle. At each end of the wall, the members travel vertically round horizontally disposed rollers or pulleys 21 into or out of the vehicle. Inside the vehicle, the members travel in an inverted position between the ends of the wall. This can readily be seen in FIGURE 5. The members 20 are connected together at their top edges, when considered in their operative position depending below the vehicle, and lateral extensions on these edges slide in a channel formation on the vehicle, in a similiar manner to that illustrated in FIGURE 1.

The members 20 may be joined together laterally by membranes 22 to provide an air-tight construction, the membranes stretching as the members 20 pass round the rollers or pulleys 21 at each end of the wall. Alternatively, the members 20 can be entirely separate, overlapping to provide a seal when in their operative position. To avoid or reduce leakage of cushion air at the ends of the wall between the members 20, fairings 23 can be provided. The gaps between the ends of the walls can be closed by air curtains as described above with reference to FIGURES 2 and 3.

The members 20 can be driven either by driving the rollers or pulleys 21 or by passing them between rollers 24 which are driven and nip the members between them.

A further form of vertical wall is illustrated in FIGURE 7. In this example a wall comprises two endless belts 25 and 26 runing side by side. The belts pass round rollers at each end, the rollers depending vertically from the botom of the vehicle. The belts are supported at their top edges in a manner similar to that shown in FIGURE 1.

To avoid the increased relative speed which would occur between the return run of each belt and the water, which would result in no overall saving in power due to drag, water is prevented from entering the spaces 27 and 28 between the two halves of each belt and also the space 29 between the two belts. A downwardly depending member 30 is positioned in each of the spaces 27, 28 and 29, and air curtains 31 are formed by air issuing from ports at the bottom edges of the members 30. The air curtains form and contain cushions of air between the belts and the members 30.

As an alternative to providing the members 30, air can be blown into the spaces 27, 28 and 29 to keep the level of the water in these spaces generally on a level with the bottom edges of the belts. Further, the formation of space 29 can be avoided by arranging the two adjacent halves of the belts 25 and 26 to be in contact with each other.

In the examples described and illustrated, the support of the belt or plate-like members by lateral extensions sliding in a channel will result in power losses due to friction. These power losses can be reduced by supporting the belt on the vehicle with cushions of pressurised fluid formed between the belt and the supporting structure.

Figure 9:
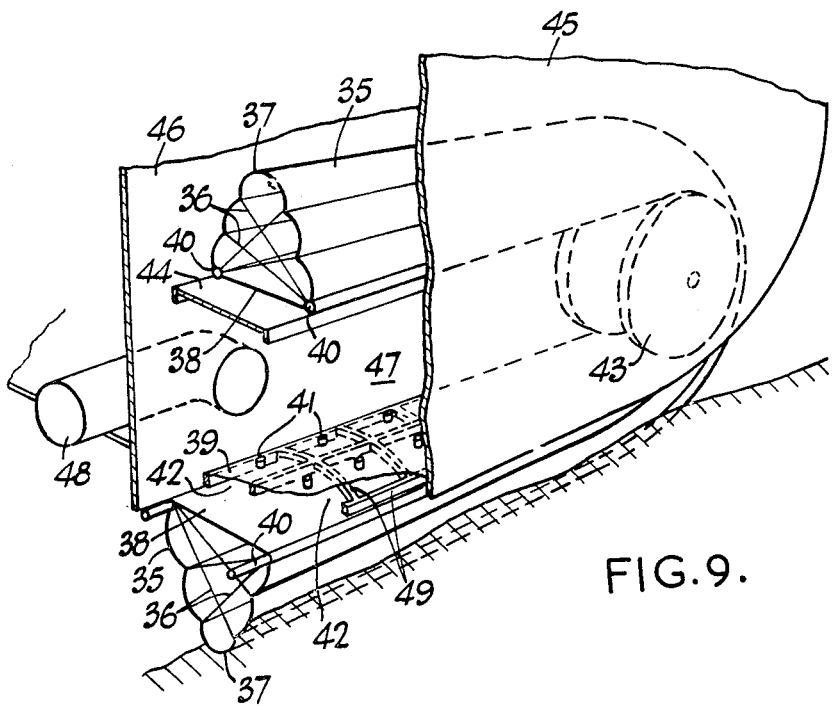
FIGURE 9 is a fragmentary perspective view of one end of the wall illustrated in FIGURE 8 with certain parts broken away and others shown in section.

FIGURES 8 and 9 illustrate a belt-like structure which is in the form of an inflated tube which, during its travel along below the vehicle bottom, is supported by cushions of pressurised fluid formed between the tube and the supporting structure of the vehicle. As seen in FIGURE 8, the belt 35 is in the form of an inflated tube having a generally triangular cross-section, which cross-section is maintained by restraining cords 36. The apex 37 of the triangle is immersed in the water when the forward run is travelling below the vehicle, the base surface 38 co-operating with a supporting surface 39 on the vehicle. The tube is driven round by means of ropes 40 attached at each edge of the base 38. Air, or other suitable fluid, is supplied through pipes 41 to the space 42 between the base surface 38 and the supporting surface 39 to form a cushion of pressurised air. The cushion is sealed at the edges by the ropes 40.

The arrangement of the mounting of the tube forming the belt 35, with the air supply and drive, can be readily seen in FIGURE 9. The tube passes round a horizontal roller 43, at each end of the wall. By driving the roller by a motor, the tube can readily be driven through the ropes 40. Whilst returning within the vehicle, the return run of the belt 35 is supported by a member 44 attached to the outer surface 45 of the vehicle and to an inner vertical member 46. The supporting surface 39 is also attached between the outer surface 45 and the vertical member 46. A closed chamber 47 is thus formed into which air is pumped via a duct 48. The pipes 41 feed the air from the chamber 47 to the space 42 between the supporting surface 39 and the base surface 38 of the tube forming the wall 35. The space is subdivided by transverse and longitudinal members 49, so as to subdivide the air cushion formed between the tube and the vehicle structure. The return run of the tube forming the wall, which is supported by the member 44, is quite light but a cushion of pressurised air can be formed between the member 44 and the tube in a similar manner as between the supporting surface 39 and the tube.

FIGURES 10 and 11 illustrate a vehicle embodying wall structures as in FIGURES 8 and 9. The belts 35, which comprise the wall structures, are hollow inflated tubes, and extend for the length of the rectangular portion of the vehicle body, the front and rear of the body being of rounded shape as shown. The bottom surface 52 of the vehicle is clear of the surface 53 over which the vehicle travels, and to provide a seal at each end of the vehicle to complete the enclosure of the cushion of pressurised gas supporting the vehicle, supply ports 54 are formed in the bottom surface of the vehicle, extending adjacent to the periphery thereof, at each end of the vehicle. Compressors with their accompanying engines are positioned in engine compartments 55 at each end of the vehicle. Air for the compressors is drawn in through intakes 56. From the compressors, air is fed via ducts 57 to supply ducts 58 adjacent to the periphery of the bottom surface of the vehicle, at each end, and from the supply ducts 58 the air flows out through the supply ports 54. Air is also fed from the compressors via the ducts 48 to the chambers 47, as in FIGURE 9, to supply the air for forming the cushions between the tubes forming the belts 35 and the supporting surface 39.

The belts 35, being inflated tubes, will provide a considerable degree of stability, particularly about the roll axis, that is about a fore and aft axis. Increased stability in pitch, i.e. about an axis extending across the vehicle, can be provided by compartmenting the cushion which supports the vehicle. This is illustrated, by way of example, in FIGURE 11 wherein a further supply port 59 is formed in the bottom surface of the vehicle, at each end, extending between the ends of the wall structures. The ports 59 are supplied with air via supply ducts 60 which can be extensions of the supply ducts 58.

Further, some or all of the rollers provided may be replaced by arcuate bearing surfaces on which the belt is supported by cushions of fluid formed and contained between a surface in the wall and the arcuate bearing surfaces. If all the rollers are replaced by such bearing surfaces an alternative means for driving the belt or belts, such as by passing between driven rollers (as in FIGURE 6), can be provided.

It will be appreciated that the drag of a wall comprising a movable member will decrease as the speed of the member increases up to a speed which is the same as the speed of the vehicle relative to the surface. The wall can be operated to run at a speed such that the relative speed is zero. Further, particularly over water, it can be operated at a speed greater than the relative speed in which case there will be a propulsive effect. Such a propulsive effect can be enhanced by forming lateral projections such as paddles, on the wall or walls described above.

The construction of the wall can be sufficiently flexible to allow distortion, for example to avoid damage if obstructions such as debris etc. are encountered. Where the vehicle is long it may be desirable for a wall to comprise more than one belt-like construction. In this case it may be necessary to provide sealing means, such as fairings, between adjacent ends of the constructions.

Whilst the examples described above have been so described as operating over water, it is also possible for vehicles incorporating the described embodiments or modifications thereof to operate over mud and similar surfaces.

We claim:

1. A vehicle for travelling over a surface and which in operation is supported above that surface, at least in part, by a cushion of pressurised gas formed beneath the vehicle, comprising at least one movable member depending from the bottom of the vehicle and extending parallel to the fore and aft axis thereof, said member including a part which comes into contact with the said surface and partially contains said cushion, and means for so moving said member that said part travels beneath the vehicle in a direction, relative to the vehicle, opposite to that in which the vehicle is travelling.

2. A vehicle as claimed in claim 1 wherein the movable member comprises an endless belt having a forward run, at least part of which comes into contact with the said surface, and a return run which returns out of contact with the said surface.

3. A vehicle as claimed in claim 2 including rollers round which the endless belt passes at each end of its span, the axis of each roller being horizontal, the belt having a substantial vertical dimension for its forward run.

4. A vehicle as claimed in claim 3 in which said belt comprises a series of plate-like members, said plate-like members extending substantially normal to the axes of the said rollers.

5. A vehicle as claimed in claim 4 including flexible webs extending between the plate-like members, said webs acting as seals between the plate-like members.

6. A vehicle as claimed in claim 4 in which said plate-like members are overlapping so as to provide seals therebetween.

7. A vehicle as claimed in claim 3 in which the belt comprises an inflatable member.

8. A vehicle as claimed in claim 7 including means for maintaining at least the forward run of the belt inflated.

9. A vehicle as claimed in claim 7 including a supporting surface positioned in the vehicle, a surface on said inflatable member co-operating with said supporting surface, and means for forming and containing at least one cushion of pressurised fluid between said supporting surface and said surface on the inflatable member.

10. A vehicle as claimed in claim 9 including means for subdividing said cushion of pressurised fluid.

11. A vehicle as claimed in claim 2 including rollers on which the endless belt is mounted having their axes at a substantial angle to the vertical, whereby the forward run of the belt has a substantial component of vertical dimension extending down and into contact with said surface, and the return run is parallel to the forward run and spaced above said surface.

12. A vehicle as claimed in claim 11 including a second endless belt operating over a path which is angularly related to the path of said first mentioned belt so as to form between them an apex presented downwardly towards said surface.

13. A vehicle as claimed in claim 12 including a supporting structure on which each of said belts is supported by means of cushions of pressurised gas, said cushions maintaining said belts out of contact with said supporting structure.

14. A vehicle as claimed in claim 13 wherein said supporting structure is hollow, and including means for supplying a gas to said hollow structure for forming said cushions of pressurised gas.

15. A vehicle for travelling over water and which in operation is supported above the surface of the water, at least in part, by a cushion of pressurised gas formed beneath the vehicle, comprising at least two movable endless belts depending from the bottom of the vehicle and extending parallel to the fore and aft axis thereof, rollers having substantially vertical axes on which said belts are supported, said belts having parts which come into contact with the water and partially contain said cushion, each of said belts having a forward run which moves in a direction, relative to the vehicle, opposite to that in which the vehicle is travelling, and a return run which moves in the opposite direction to the forward run, means for driving said belts in opposite directions, the return runs facing towards each other, and means for excluding water from the region between the forward runs.

16. A vehicle as claimed in claim 15 including means for blowing air into said region.

17. A vehicle for travelling over a surface and which, in operation, is supported above that surface, at least in part, by a cushion of pressurised gas formed and contained beneath the vehicle, comprising at least one wall positioned along each side of the vehicle, each of said walls comprising at least one movable belt-like structure part of which comes into contact with said surface, means for movably supporting the belt-like structure on the lower part of the vehicle, the structure having a forward run and a return run, means for moving the structure whereby said forward run is caused to travel along below the vehicle in a direction, relative to the vehicle, opposite to that in which the vehicle is moving, said return run travelling in the opposite direction to the forward run, and means for causing a fluid to issue from the lower part of the vehicle to form curtains of moving fluid extending between the ends of the walls, said movable belt-like structure and said curtains of moving fluid co-operating to contain the cushion of pressurised gas formed beneath the vehicle.

18. A vehicle as claimed in claim 17 including means for forming further curtains of moving fluid from the lower part of the vehicle, said further curtains subdividing the cushion of pressurised gas.

19. A vehicle as claimed in claim 2 including lateral projections on said belt for imparting a propulsive effort to the vehicle.

20. A vehicle for travelling over water and which in operation is supported above the surface of the water, at least in part, by a cushion of pressurised gas formed beneath the vehicle, comprising at least one movable member depending from the bottom of the vehicle and extending parallel to the fore and aft axis thereof, said member including a part which comes into contact with the surface of the water as said member moves relative to the vehicle and acts simultaneously to partially contain the cushion and to propel the vehicle.

21. A vehicle as claimed in claim 20 wherein the movable member comprises an endless belt having a forward run, at least part of which comes into contact with the surface of the water, and a return run which returns out of contact with the said surface, and lateral projections on said belt for imparting a propulsive effort to the vehicle.

References Cited by the Examiner

UNITED STATES PATENTS

| 809,048 | 1/06 | Furchtbar | 180—7 |
| 3,074,764 | 1/63 | Bertelsen | 180—7 |
| 3,095,938 | 7/63 | Bertelsen | 180—7 |

A. HARRY LEVY, *Primary Examiner.*

PHILIP ARNOLD, *Examiner.*